United States Patent [19]

Boisseau et al.

[11] Patent Number: 4,583,238
[45] Date of Patent: Apr. 15, 1986

[54] SYNCHRONOUS DATA TRANSMISSION SYSTEM USING A CARRIER MODULATED BY AN ENVELOPE OF CONSTANT AMPLITUDE

[75] Inventors: Alain Boisseau, Juvisy sur Orge; Claude Pivon, Sainte Genevieve des Bois, both of France

[73] Assignee: Societe Anonyme dite: Sintra-Alcatel, France

[21] Appl. No.: 492,761

[22] Filed: May 9, 1983

[30] Foreign Application Priority Data

May 10, 1982 [FR] France .................. 82 08043

[51] Int. Cl.$^4$ ............................................. H04L 27/18
[52] U.S. Cl. .......................... 375/53; 375/56; 375/85; 375/86; 329/104; 332/10
[58] Field of Search .................. 375/52, 53, 54, 56, 375/57, 83, 85, 86; 364/728, 819; 329/104, 107; 332/9 R, 10

[56] References Cited

U.S. PATENT DOCUMENTS

| | | | |
|---|---|---|---|
| 4,008,373 | 2/1977 | Nash et al. | 375/56 |
| 4,146,841 | 3/1979 | McRae | 375/86 |
| 4,216,543 | 8/1980 | Cagle et al. | 375/95 |
| 4,320,499 | 3/1982 | Muilwijk et al. | 375/56 |
| 4,346,472 | 8/1982 | Ohkoshi et al. | 375/56 |
| 4,373,151 | 2/1983 | Houdard et al. | 329/104 |

FOREIGN PATENT DOCUMENTS 0018242 10/1980 European Pat. Off.
2004442 3/1979 United Kingdom.

OTHER PUBLICATIONS

Alta Frequenza, vol. 40, No. 2, Feb. 1971, Milano, Italy, G. Vettori, "Digital Generation of a Linear FM Pulse of Given Time-Bandwidth Product, pp. 140–146.
IEEE Transactions on Vehicular Technology, Vo. V.T. 30, No. 3, Aug. 1973, New York, US, S. Asakawa et al, "A Compact Spectrum Constant Envelope Digital Phase Modulation", pp. 102–111.
IBM Technical Disclosure Bulletin, vol. 17, No. 12, May 1975, J. F. Dubil et al, Stored Waveform Technique for DPSK Modem.

Primary Examiner—Benedict V. Safourek
Attorney, Agent, or Firm—Sughrue, Mion, Zinn, Macpeak & Seas

[57] ABSTRACT

A transmission system is provided with a transmitter (10) transmitting data in series, either individually or in groups, by phase shifts applied to a transmitter carrier between characteristic instants which are separated by equal time intervals. The system further comprises a receiver (20) which is sensitive to phase shifts in the transmitter carrier between the characteristic instants. The transmitter comprises a coder (2) which causes the data to be transmitted to correspond to discrete values of a shift, and a symbol synthesizer (3) under the control of the coder to generate the waveform of the phase variation between two successive characteristic instants. This waveform is continuous and has minimum gradient and can be expressed as a function of time by a polynomial law. The receiver uses a synchronous demodulation and a correlation method to recover the characteristic instants and also the frequency drift between the transmitter carrier and the receiver carrier.

8 Claims, 3 Drawing Figures

SYNCHRONOUS DATA TRANSMISSION SYSTEM USING A CARRIER MODULATED BY AN ENVELOPE OF CONSTANT AMPLITUDE

The present invention relates to synchronous data transmission systems using carrier modulation which ensures an envelope of constant amplitude, which are particularly useful for radio links because of the constant power level of the carrier.

BACKGROUND OF THE INVENTION

In such systems, the data to be transmitted are converted, either singly or in groups, into successive symbols of duration $\Delta$ known as the Baud interval to constitute a base band signal which is then used to frequency or phase modulate a carrier of constant envelope amplitude. Most systems of this kind are known as frequency shift keying (FSK) or phase shift keying (PSK) systems which use symbols having a simple rectangular shape.

Because of the phase or frequency modulation, such systems have the drawback of using a transmission signal whose pass band is considerably larger than the pass band occupied by symbols which use single or residual sideband modulation. The occupied band width decreases with increasing modulation index, but its minimum remains close to the width occupied by double sideband amplitude modulation.

One known way of reducing the bandwidth occupied by a frequency or phase modulation transmission system is to reduce the bandwidth of the signal in the base band. For example, minimum shift keying (MSK) transmission systems are known in which the symbols used are triangular in shape in order to give the base band signal a sawthooth appearance. Another example is constituted by sinusoidal frequency shift keying (SFSK) transmission systems in which the symbols are sinusoidal in shape, giving the base band signal the appearance of a series of sinusoidal arches. In both cases each symbol corresponds to an increase or a decrease of carrier phase by $\pi/2$, and this limits the number of possible states for each symbol to two, thereby preventing any increase in transmission speed by adopting a greater number of discrete values for the transmitted symbols.

It is also known to apply the conventional data transmission arrangements to the base band signal to reduce the width of the occupied band, i.e. to employ partial response coding and filtering in accordance with Nyquist criteria. However, that results in increasing the number of discrete values possible at the receiver end for a single transmitted symbol value.

Preferred embodiments of the present invention provide a data transmission system using a modulated carrier of constant envelope amplitude which occupies small frequency bandwidth relative to its data rate, and which avoids the limitations of the systems mentioned above.

In such preferred embodiments, the transmitter and receiver portions are easily realised in digital form using large scale integration (LSI) microcircuits.

SUMMARY OF THE INVENTION

The present invention provides a transmission system in which data is transmitted serially, either singly or in groups, in synchronous manner and corresponding to coding on a limited number of discrete values of carrier phase shift between characteristic instants which are separated by constant time intervals known as Baud intervals, with the phase of the carrier changing continuously during each baud interval in accordance with a phase change law $\phi(T)-\phi(O)$ which expresses a symbol as a function of time over the interval, and has the form:

$$\phi(T) - \phi(O) = T\left(a + bT\left(1 - \frac{5T}{9\Delta}\right)\right)$$

where $O \leq T \leq \Delta$ in which the coefficient a is equal to the weighted sum of the phase shifts performed during the transmission of the two symbols, with the weighting coefficient for the previous symbol being $3/(4\Delta)$ and for the symbol before that $3/(16\Delta)$, and in which the coefficient b is equal to $9/4(\Delta^2)$ of the difference between the phase shift to be performed during the current symbol and the product of the coefficient a multiplied by the duration $\Delta$ of a single symbol.

For transmission, the phase variation law may be stored in the form of groups of samples in a digital memory with the samples being selected from the phase shift to be performed as determined by the current coding and the two previous codings.

On reception, the data is recovered from the values of the phase shifts which begin and end at the ends of the symbols. To do this, the phase variation law of the transmission carrier is extracted by synchronous demodulation of the received signal. During a precoding phase, said phase variation law is subtracted from a version of itself delayed by the symbol duration in order to deliver the instantaneous value of the phase shift undergone by the carrier over the duration of one symbol. Since phase shifts are selected at the beginning and the end of symbol periods, drift between the transmitter carrier and the receiver carrier is observed by a double correlation which takes into account the fact that the phase shifts being sought over the duration of one symbol, are the only ones to have the given discrete values used at the transmitter for encoding the data. Drift between the transmitter carrier and the receiver carrier appears as a DC component or a very slowly varying AC component.

BRIEF DESCRIPTION OF THE DRAWINGS

An embodiment of the invention is described by way of example with reference to the accompanying drawings, in which.

MORE DETAILED DESCRIPTION

Figure 1:
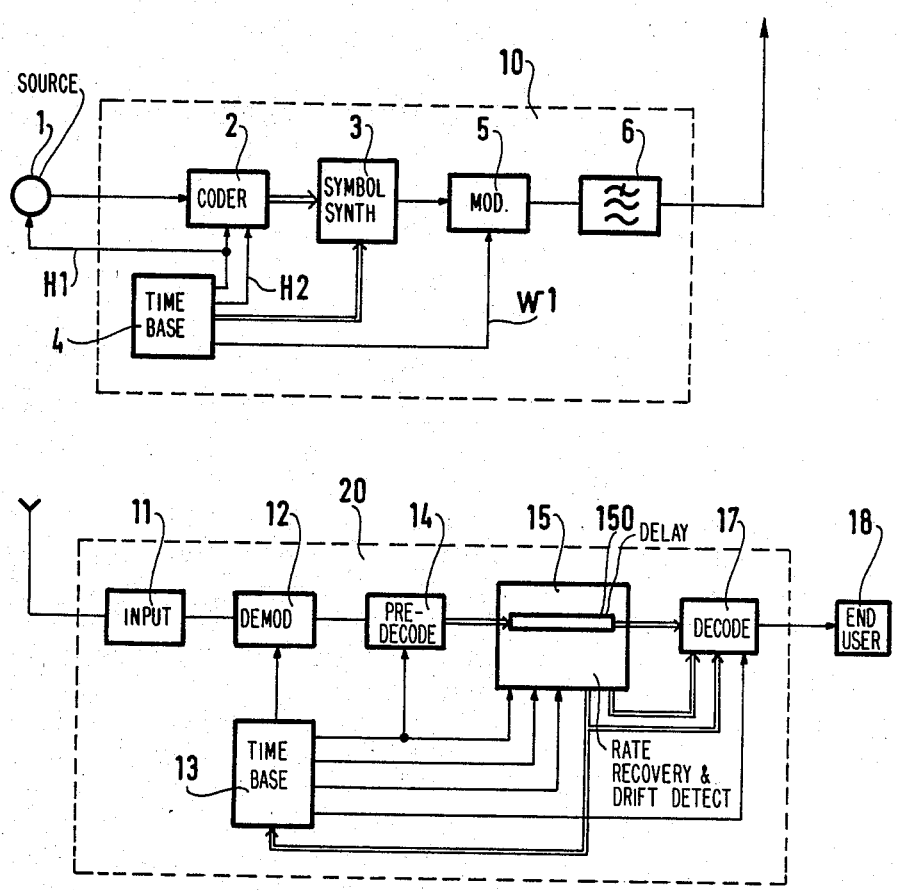
FIG. 1 is a block diagram of a data transmission system in accordance with the invention.

Prior art data transmission systems using an angularly modulated carrier which retains an envelope of constant amplitude demonstrate that it is possible to reduce the width of the frequency band occupied by replacing rectangular symbols as used in PSK or FSK systems by symbols which allow continuous phase variation of the carrier, in which case the data are represented by phase differences between the ends of the symbols. Consider the transmission of a series of symbols $S_O, \ldots S_n$ each of which occupies a constant time interval known as the Baud interval, the phase variation $\phi(t)$ of the carrier can be decomposed into a succession of phase variations $\phi_O(t), \ldots, \phi_n(t)$ of the carrier during each symbol period:

$$\phi_n(t) = \delta(t - n\Delta)\phi(t)$$

The origin of the symbol $S_O$ is chosen as the time origin and the function $\delta$ is conventionally defined by the equation:

$$\delta(t - n\Delta) = 1 \text{ for } n\Delta \leq t \leq (n+1)\Delta \text{ and } 0 \text{ the rest of the time}$$

The transmission signal transmitted during a symbol $S_n$ may be considered as the real part of the following complex signal:

$$V_n = A \exp(i\omega_O t + i\phi_n(t))$$

where $\omega_O$ is the frequency of the carrier before modulation and A is the constant level of its envelope which has a spectrum of frequency $V_n(\omega)$ which is expressed by the Fourier interval $$V_n(\omega) = A \int_n^{(n+1)} \exp(i\omega_O t + i\phi_n(t) - i\omega t) dt$$

This integral operates on a function of constant modulus whose phase varies very fast. Since $\phi_n(t)$ is a continuous function, the stationary phase principle may be applied, according to which only points where:

$$\frac{d}{dt}(\omega_0 t + \phi_n(t) - \omega t) = 0$$

provide an appreciable contribution. These points are those for which:

$$\omega - \omega_0 = \frac{d\phi_n(t)}{dt}$$

The width of the spectrum about $\omega_O$ is given to a first approximation by:

$$\max(\omega - \omega_0) = \max \frac{d\phi_n(t)}{dt}$$

To reduce the spectrum width occupied during the transmission of the symbol $S_n$ as much as possible, it is thus necessary to minimise the maximum slope of the phase variation law $\phi_n(t)$ during the symbol. Thus, we have four conditions for determining this law $\phi_n(t)$:

(1 and 2) obtain the same value of phase and the same slope at the beginning of each symbol $S_n$ and at the end of the immediately preceding symbol $S_{n-1}$;

(3) obtain the desired phase variation by the end of the symbol $S_n$; and (4) minimise the maximum slope of the phase during the symbol $S_n$.

A third degree polynomial is used to solve this problem, thereby obtaining a phase law of the following form during each symbol $S_n$:

$$\phi_n(T) = \phi_n(O) + a_n T + b_n T^2 + c_n T^3$$

where $T = t + n\Delta$.

The coefficient $\phi_n(O)$ which is the phase at the beginning of the symbol $S_n$ must be equal to the phase at the end of the preceding symbol $S_{n-1}$:

$$\phi_n(O) = \phi_{n-1}(\Delta)$$

The coefficient $a_n$ is the slope of the phase law at the beginning of the symbol $S_n$ and must be equal to the slope of the phase law at the end of the preceding symbol:

$$a_n = \frac{d\phi_n(O)}{dt} = \frac{d\phi_{n-1}(\Delta)}{dt}$$

The coefficients $b_n$ and $c_n$ are determined by the phase $\phi_n(\Delta)$ to be obtained at the end of the symbol $S_n$ taking into account the desired phase variation and the required minimisation of the maximum slope of the phase law:

$$b_n = \frac{9}{4\Delta^2}(\phi_n(\Delta) - \phi_n(O) - a_n \Delta)$$

$$c_n = -\frac{5}{4\Delta^3}(\phi_n(\Delta) - \phi_n(O) - a_n \Delta)$$

or, as a function of the phase skip $\theta_n$ performed during the symbol $S_n$ $$b_n = \frac{9}{4\Delta^2}(\theta_n - a_n \Delta)$$

$$c_n = -\frac{5}{4\Delta^3}(\theta_n - a_n \Delta)$$

The coefficient $A_n$ is obtained by recurrence from the coefficient $a_{n-1}$ of the preceding symbol $S_{n-1}$ by applying equation 1

$$a_n = \frac{3}{4\Delta}\theta_{n-1} + \frac{1}{4}a_{n-1}$$

which over three successive symbols gives:

$$a_n = \frac{3}{4\Delta}\theta_{n-1} + \frac{3}{16\Delta}\theta_{n-2} + \frac{3}{64\Delta}\theta_{n-3} + \frac{1}{64}a_{n-3}$$

It can be seen that the influence of the phase shifts during the preceding symbols decreases rapidly and that it suffices to take only three successive symbols into consideration. A modified conventional PSK system giving n distinct values of phase shift thus leads to $n^3$ possible phase variation laws during a single symbol. This number may be reduced by prohibiting certain shift configurations and by reasons of symmetry.

There follows a description of an example of a digital transmission system in accordance with the invention, derived from a four state phase shift transmission system A general block diagram is given in FIG. 1. A synchronisable source 1 delivers binary data to be transmitted in serial form and applies them to a transmitter 10 which is in radio communication with a receiver 20 which reconstitutes the data to an end user 18. The transmitter 10 comprises a coder 2 which determines the phase shifts corresponding to the data to be transmitted together with the usable phase variation law, a symbol synthesizer 3 controlled by the coder 2, a transmission time base 4 delivering a transmission carrier and various timing signals required for synchronising the source of data 1, the coder 2 and the synthesizer 3, a modulator 5 applying angular modulation to the transmission carrier in accordance with the phase variation laws generated by the symbol synthesizer 3, a low pass filter 6, and optionally an amplification stage according to the usual radio transmitter technique. The receiver 20 comprises an antenna input circuit 11, a synchronous demodulator 12 operating on the basis of a local carrier delivered by a receiver time base 13, a predecoder 14 delivering the instantaneous value of the phase shift of the carrier over the duration of a symbol, a symbol rate recovery circuit and drift detector for detecting drift between the receiver and transmitter carriers 15, receiving the signal from the predecoder 14 and clock signals from the receiver time base 13 for generating a clock signal which is synchronous with the transmitted symbols and a signal representative of the drift between the transmitter and receiver carriers, a delay circuit 150 internal to the rate recoverer and drift detector 15 compensates for the time taken thereby for processing, and a decoder 17 connected to the output of the predecoding circuit 14 via the delay circuit 150 and driven by the rate recoverer and drift detector 15 which delivers the received data to the utilisation 18.

This transmission system makes each bit pair at the emitter correspond to a single symbol during which there is a phase shift of 0, $+\pi/2$, $-\pi/2$ or $\pm\pi$ depending on the value of the bit pair. The freedom of choice in the direction of the phase shift of amplitude $\pi$ stems from the $2\pi$ periodicity of trigonometric functions and is taken advantage of to avoid those successions of phase shifts which are most costly in band width ($+\pi$, $-\pi$), ($+\pi/2$, $-\pi$), ($-\pi$, $+\pi$), ($-\pi/2$, $+\pi$). The shape of the phase variation once the phase skip to be performed is known, is defined by a phase variation law as follows:

$$\phi_n(T) - \phi_n(O) = a_n T + b_n T^2 + c_n T^3 \quad O \leq T \leq \Delta$$

in which the coefficients $a_n$, $b_n$ and $c_n$ are determined as a function of the phase shift $\theta_n$ to be performed and the phase shifts $\theta_{n-1}$ and $\theta_{n-2}$ performed during the two previously transmitted symbols using the formulae:

$$a_n = \frac{3}{4\Delta}(\theta_{n-1} + \tfrac{1}{3}\theta_{n-2})$$

$$b_n = \frac{9}{4\Delta^2}(\theta_n - a_n\Delta)$$

$$c_n = -\frac{5}{4\Delta^3}(\theta_n - a_n\Delta)$$

Given the five authorised phase shift values, there are theoretically 125 possible phase laws (five to the power of three) but this number comes down to 90 because of the forbidden successions of phase shifts and is divided by two by reasons of symmetry. This number is small enough for the phase variation laws to be stored in sampled form in a digital memory.

Figure 2:
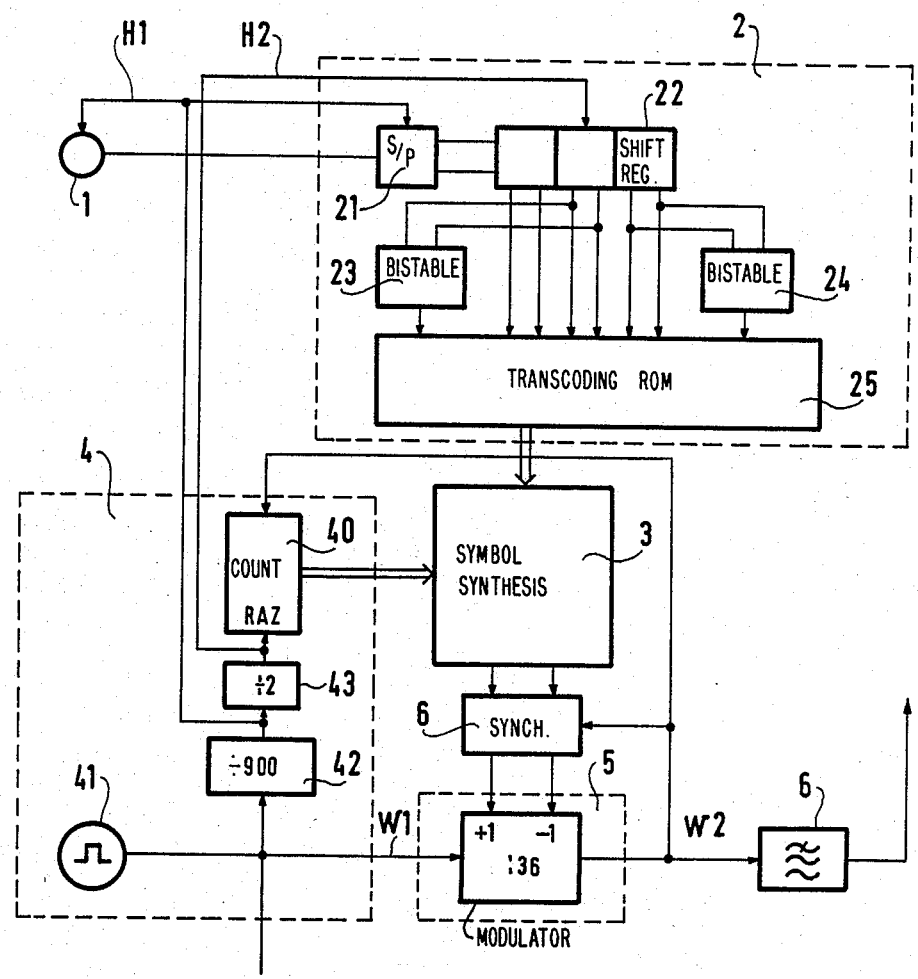
FIG. 2 is a more detailed block diagram of the transmitter components of the transmission system shown in FIG. 1.

FIG. 2 shows the completely digital structure of the transmitter 10.

The coder 2 comprises:

A series to parallel converter 21 which transforms the series of binary data bits to be transmitted into two synchronous series at half the rate, which is equal to the Baud rate, thereby delivering bit pairs; a pair of shift registers 22 having three stages each with serial inputs and parallel outputs provide the bit pair to be transmitted as well as the two preceding bit pairs; two bistables 23 and 24 are responsive to certain values of bit pairs and have their inputs connected to the outputs of the second and third stages of the double shift register 22; and a transcoding read only memory 25 having its inputs connected to the outputs of the bistables 23 and 24 and to the outputs of the double shift register 22.

The bistables 23 and 24 determine the direction of the phase skips of value $\pi$ in such a manner as to avoid the forbidden successions of phase skips. They are responsive to bit pairs whose values correspond to phase shifts of $+\pi/2$ and $-\pi/2$. The appearance of a bit pair corresponding to a phase shift of $+\pi/2$ at the input to either of the bistables puts the output of the bistable into a state which ensures that any $\pi$ value phase skip is positive, regardless of whether the phase shift corresponds to the bit pair available at that instant on the output from the preceding stage of the double shift register or to the bit pair present at the following Baud instant at the input to the bistable. The appearance of a bit pair corresponding to a phase shift of $-\pi/2$ at the input to either of the bistables has the opposite effect. Thus, each bit pair present at the outputs from the three stages of the shift register 22 is associated with an extra bit indicating the direction of a phase shift of value $\pi$, should there be one. The read only memory 25 serves to reduce the 8 bits delivered by the outputs of the bistables 23 and 24 and the double shift register 22 into 7 bits which is all that is required to select one item from a total of 45.

The symbol synthesizer 3 is a read only memory arranged in 45 pages with the coder selecting a specific one of said 45 pages. Each page contains samples of the phase variation law corresponding to the configuration of bit pairs at the outputs of the shift register which gave rise to the selection of that page. The samples progress in equal amplitude stages which may be present or absent, and positive or negative. Thus each sample is in the form of a bit pair, and sufficient samples are taken for quantification in small steps thereby limiting sampling noise. For example, each phase variation law may comprise 50 samples giving a quantification step of $\pm 10$ degrees, which requires a read only memory having a capacity of 4,500 bits. The synthesizer read only memory is addressed within each page by means of a 7 bit counter 40 which is reset to zero at the end of each Baud period and which is incremented by a clock signal coming from the modulator 5 and having an average frequency which is 50 times the Baud rate.

The modulator 5 is a counter which normally divides by thirty-six, but which can also divide by thirty-five or thirty-seven depending on the state of a two bit control input connected via a synchronising stage 7 to the read output from the symbol synthesizer memory 3. The modulator receives a driving clock signal $\omega_1$ from the transmitter time base 4 and delivers a rectangular signal whose average period $1/\omega_2$ is equal to $36/\omega_1$ and which may be shortened or lengthened by $1/36$ (10 degrees) depending on whether the count is changed to 35 or 37.

The synchronising stage 7 is controlled by the output signal from the modulator 5 and ensures that the division ratio only changes at the beginning of each period of the output signal from the modulator 5.

The low pass filter 6 serves to filter sampling noise from the phase variation laws. In practice, it forms a part of a phase controlled loop of a voltage control oscillator which may also perform frequency translation and which serves to generate the transmission signal.

The transmitter time base 4 generates timing signals required by the data source 1, the coder 2 and the symbol synthesizer 3 on the basis of a single oscillator which also delivers the driver frequency $\omega_1$.

The baud rate $1/\Delta$, or symbol frequency, is one 1,800-th of the driver frequency $\omega_1$ (50×36). It is obtained by means of two dividers in cascade, a first divider 42 dividing by 900 and providing a clock signal $H_1$ at the data rate for synchronising the data source 1 and the serial to parallel converter 21, and the other divider 43 dividing by 2 to provide a clock signal $H_2$ at the Baud rate $1/\Delta$ and used to shift the double shift register 22 and to reset the counter 40 to zero as used for addressing the symbol synthesizer memory 3 within each page. This reset to zero signal serves to resynchronise page reading in the synthesizer memory 3 on the Baud rate. Reading takes place asynchronously because the phase modulation affects its own clocking signal. Resynchronisation may thus abridge reading within a page by causing the last sample to be omitted, or it may lengthen reading within a page by causing the first sample to be read twice.

Figure 3:
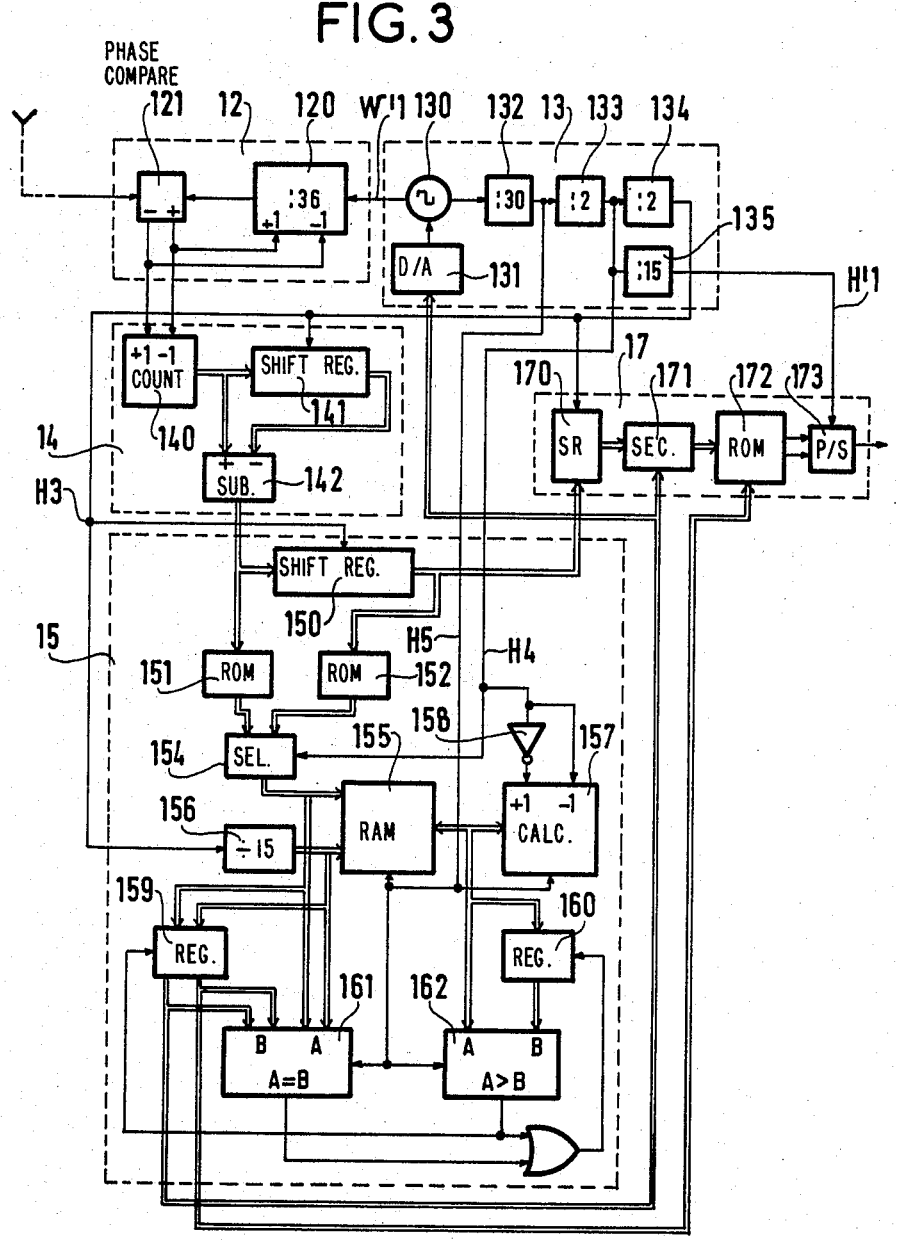
FIG. 3 is a more detailed block diagram of the receiver components of the transmission system shown in FIG. 1.

FIG. 3 is a more detailed block diagram of the receiver 2 apart from the antenna circuits and the demodulator which are of conventional design and do not form a part of the present invention.

The synchronous demodulator 12 is constituted by a programmable divider 120 operating as a phase modulator, and by a phase comparator 121 used by the programmable divider 120 to control the phase of a local carrier to match the output signal from the transmission modulator 5 as received by the receiver antenna circuits.

The phase comparator 121 has two inputs on which it receives a version of the output signal from the transmitter modulator 5 as delivered by the receiver antenna circuits, and a local carrier as delivered by the programmable divider 120. It has two distinct outputs on which it provides two binary signals, one of which represents a reduction in phase difference between its two input signals and the other of which represents an increase. These signals are used to fix the division ratio of the programmable divider 120.

The programmable divider 120 divides by 36±1 under the control of the phase comparator 121. In other words, if the phase comparator detects a reduction in phase difference it divides by 37, if it detects an increase it divides by 35 and if the phase difference remains constant it divides by 36. The programmable divider 120 receives a driving frequency $\omega'_1$ from the receiver time base 13 which is equal to the transmitter driver frequency $\omega_1$. At its output it delivers an output signal with the same average period $\omega_1/36$ apart from drift between the two driver frequencies $\omega_1$ and $\omega'_1$, as the signal at the output of the transmission modulator 5 as received at the phase comparator 121 via the receiver antenna circuits. When the phase comparator 121 detects an increasing phase difference, the period of its output signal is reduced by 1/36 which is the same a phase shift of $-10$ degrees in the opposite direction of said increase. In the converse case, when the phase comparator 121 detects a reducing phase difference, the period of said output signal is increased by 1/36 which is the same as a phase shift of $+10$ degrees again going against the direction of said change in phase difference. After locking, the ±10 degrees phase shifts applied by the programmable divider 121 are identical to the ±10 degrees phase shifts applied by the transmitter's modulator, except insofar as the driver frequencies $\omega_1$ and $\omega'_1$ are drifting relative to each other.

The elementary phase shifts of ±10 degrees as detected by the phase comparator 121 of the demodulator 12 are applied to a predecoding circuit 14 which generates the overall value of the phase skip since the beginning of the current Baud interval $\Delta$, and which samples this value 15 times per Baud period $\Delta$.

The predecoding circuit 14 comprises a six-bit looped binary up/down counter 140 which counts up or down in two's complement between limits of ±18 at the rate of the signals from the phase comparator 121, thereby reproducing the transmission phase modulating law ignoring drift between the driver frequencies $\omega_1$ and $\omega'_1$. A shift register 141 having 15 stages of 6 bits each in parallel, is connected to the output of the binary up/down counter 140 and is clocked by a clock signal $H_3$ at 15 times the Baud frequency $1/\Delta$.

A digital subtractor 142 calculates the difference between the input and output signals of the 15 stage shift register 141 and delivers the output signal of the predecoding circuit 14.

Ignoring errors due to the quantification introduced by the sampling, and due to the frequency drift between the driver frequencies $\omega_1$ and $\omega'_1$, the phase shift at the transmitter which corresponds to the bit pair to be identified, also corresponds to one of the 15 samples delivered during each Baud period from the predecoding circuit 14. The sampling during each Baud period is sufficiently dense to ensure that quantification error can be ignored. However, drift between the driver frequencies $\omega_1$ and $\omega'_1$ appears in the detected phase shift values as a DC component or as a slowly varying component which is independent of the values of the transmitter phase shifts. To determine the value of this DC component, and also to determine which one of the 15 samples of the output signal from the predecoding circuit actually corresponds to the phase shift between the beginning and the end of each symbol, a double correlation method is performed over a period of several symbols, e.g. 38 in the present case. The double correlation is performed between symbols in the same rank out of the fifteen and having the same DC component, where the DC component is considered as the difference between the value of the phase shift sample under consideration and the closest of the possible threshold values 0, $\pm\pi/2$ and $\pm\pi$. Since the phase shifts are estimated to within 10 degrees, and since the maximum difference between the value of one phase shift sample and the nearest of the threshold values 0, $\pm\pi/2$, $\pm\pi$ is ±45 degrees, this double correlation creates 9 different categories depending on the value of the DC component, and 15 groups per category depending on the rank of the sample in amongst the 15 samples, giving a total of 135 classes. The received phase shift samples which correspond to the phase shifts between the beginnings and the ends of the symbols are perturbed by the DC component due to the drift between the driver frequencies $\omega_1$ and $\omega'_1$ and they thus form part of a common class which is different from all the others, given the variety of forms which the phase variation law can take within a symbol. This class has the most elements and can be identified by counting the number of elements in the various classes derived by the correlation.

The correlator 15 which performs this processing comprises a shift register 150 having 720 six-bit stages which stores the phase shifts delivered by the predecoding circuit 14 for a duration of 48 symbols in such a manner as to enable each phase shift to be taken into consideration for correlation as soon as it appears at the output of the precoding circuit 14 and to remove it 48 symbol periods later. The shift register 150 is clocked in synchronisation with the shift register 141 of the precoding circuit 14 by the clock signal $H_3$. Its serial input and output are connected to two identical transcoding read only memories 151 and 152 which determine the difference of each value of phase shift relative to the nearest of the threshold values 0, $\pm\pi/2$, $\pm\pi$, and which provides the answer as a four-bit binary number. The outputs from the read only memories 151 and 152 are connected to a selector 154 having two four-bit inputs and controlled to switch at thirty times the Baud rate by means of a clock signal $H_4$ which is at twice the frequency of the clock signal $H_3$. During the period $\Delta/15$ for which each phase shift sample is present at the output of the precoding circuit 14, the selector 154 serves to insert one new sample into the correlator and to remove one old sample therefrom.

A read/write memory 155 stores the occupation levels of the different correlation classes. It is addressed by two indices: one from the output signal from the selector 154 which selects between correlation categories, i.e. as a function of the phase difference relative to the nearest threshold level; and the other from the output signal from a divide by fifteen counter 156 having a five-bit parallel output which performs a second selection within the categories as a function of the rank of each sample out of the possible 15 ranks. This counter is clocked by the clock signal $H_3$. The read/write memory 155 is connected by a two-way data bus to a calculator unit 157 which updates the occupation totals of the different correlation classes.

The calculation unit 157 can either increment or decrement data from the read/write memory 155 by a unit amount. It comprises an increment control and a decrement control which are under the common control of the clock signal $H_4$, one under its direct control and the other via an inverter 158. The clock signal $H_4$ is the same as the signal addressing the selector 154. The calculator unit 157 further includes a control input which is connected in parallel with the read/write control of the read/write memory 155 and which is controlled by a clock signal $H_5$ at four times the frequency of the clock signal $H_3$.

One period of the clock signal $H_3$ represents the duration for which a phase shift sample is present at the output from the predecoding circuit 14. During the first quarter of this period, the read/write memory 155 is in read mode, and is addressed under the control of the phase shift sample present at the output of the precoding circuit 14. During the first quarter period, the read/write memory 155 is in read mode, and since its addressing is controlled by the phase shift sample present at the output from the precoding circuit 14, the calculator unit 157 which is instructed to proceed with an incrementation, reads the value of the count in the read/write memory 155 and increases it by one. During the second quarter period the read/write memory 155 whose addressing has not changed moves into write mode and records the new value of the count as delivered by the calculator unit 157. At the beginning of the third quarter of the period, the read/write memory 155 switches back to read mode, and the selector 154 switches over to address the read/write memory 155 from the phase shift sample at the output of the shift register 150, i.e. by the sample which is 48 symbols older than the preceding sample, and the calculator unit 157 receives a decrement order. It thus reads the count value in the read/write memory 155 and decrements it by one unit. During the last quarter period the addressing of the read/write memory 155 has not changed but it is now in write mode and it records the new count value delivered by the calculator unit 157. The overall sum of the different counts stored in the read/write memory 155 remains constantly equal to 720 which corresponds to the number of samples taken into account by the double correlation. Only the distribution of the components of this sum within the different classes changes as a function of the position of the symbols relative to the clock signal $H_3$ and as a function of the drift between the driver frequencies at the transmitter $\omega_1$ at at the receiver $\omega'_1$.

A maximum detector serves to determine at each instant which correlation class the largest count. The detector comprises a memory address register 159 connected in parallel on the addressing circuits of the read/write memory 155, a data memory register 160 connected in parallel on the data bus which connects the calculator unit 157 to the read/write memory 155, a two input address comparator 161 connected to the address lins of the read/write memory 155 and to the output from the address memory 159 to detect equality between the two addresses applied to its inputs, and a two input data comparator 162 connected to the data bus and to the output from the data memory register 160 to detect when the data present on the address bus is greater than the data recorded in the data memory register 160.

The data comparator 162 is activated by the clock signal $H_5$ each time the read/write memory 155 is in write mode. It loads the data memory register 160 and the address memory register 159 each time that it detects the presence on the data bus of data whose amplitude is greater than that stored in the data memory register 160, thereby ensuring that the address memory register stores the address of the correlation class which has the largest count.

The address comparator 159 is also activated by the clock signal $H_5$ each time the read/write memory 155 is in write mode. It controls loading into the data memory register 160 each time the count which is memories is updated.

It should be observed that the largest count is effectively determined even though the read/write memory 155 is not systematically scanned, since the largest count is necessarily addressed most often during the sample distribution procedure. The address of this count which is stored in the address memory register 159 gives that rank out of the fifteen which most probably coincides with the ends of the transmitted symbols, together with the value of the most likely DC component due to the drift between the driver frequencies $\omega_1$ and $\omega'_1$ at the transmitter and the receiver. This information is used by the decoder 17 to select its samples and its threshold values.

The decoder 17 has a fifteen stage shift register 170 at its input with each stage having six bits in parallel. The shift register has serial input and parallel output. Its input is connected to the output from the shift register 150 of the correlator and is clocked in synchronism therewith by the clock signal $H_3$. A selector 171 having fifteen inputs is connected to the parallel outputs of the shift register 170. It is addressed by that part of the output signal from the address memory register 159 which corresponds to the choice of one rank out of the fifteen possible. And during each Baud interval it delivers that one of the fifteen phase shift samples which coincides with the ends of a symbol. A decoding read only memory 172 is partially addressed by that portion of the output signal from the address memory register 159 relating to the value of the DC component due to the drift between the transmitter driver frequency $\omega_1$ and the receiver driver frequency $\omega'_1$, and partly by the phase shift sample supplied by the selector 171 in order to deliver the value of the transmitted bit pair. A parallel to series converter 173 connected at the output from the decoding read only memory 172 multiplexes the bit pairs and resynchronises the data on a clock signal $H'_1$ at twice the Baud rate.

The receiver time base 13 delivers all of the clocking signals required on the basis of a single oscillator 130 and a series of dividers. The oscillator 130 delivers the receiver driver frequency $\omega'_1$. It has a control loop for keeping its drift relative to the transmitter driver frequency $\omega_1$ and using the estimate of the drift provided by the correlator 15. It may, for example, be a voltage controlled oscillator controlled by an integrator circuit having an up/down counter and a digital to analog converter 131 which provides a voltage which is incremented or decremented at a regular period as a function of the sign and the amplitude of the observed drift.

The clock signal $H_3$ whose rate must be fifteen times the Baud rate is derived from the receiver driver frequency $\omega'_1$ which, like the transmitter driver frequency $\omega_1$, is 1,800 times the Baud rate by dividing by 120. The clock signal $H_4$ which is at twice the frequency of the clock signal $H_3$ is derived from the receiver driver frequency $\omega'_1$ by dividing by 60. The clock signal $H_5$ which is at four times the clock signal $H_3$ is taken from the driver frequency by dividing by 30. The clock signal $H'_1$ at the data rate, i.e. at twice the Baud rate, is taken from the receiver driver frequency $\omega'_1$ by dividing by 900. This can be obtained, as shown, by a cascade of dividers, the first of which 132 divides by 30 and delivers the clock signal $H_5$, the second of which 133 connected downstream from the first divides by 2 and delivers the clock signal $H_4$, the third of which 134 is connected downstream from the second and divides by 2 again delivering the clock signal $H_3$ and the fourth of which 135 also connected to the output of the second divides by 15 and delivers the clock signal $H'_1$.

The transmission system which has been described is particularly advantageous in cases where data is to be transmitted at 16K bits per second, since it enables the data transmission to take place over a 25 kHz channel with signals outside the channel being approximately 50 dB down. The receiver can be adapted to all types of differential phase shift modulation and is not sensitive to the shapes of various phase laws used. It is particularly useful in that it does not require a learning sequence in order to obtain synchronisation between the local carrier and the receiver clock so it can be used to receive transmissions of short duration, e.g. only about 100 symbols.

We claim:

1. A synchronous data transmission system using a modulated carrier of constant envelope amplitude, said system comprising a transmission carrier source, a transmitter means for transmitting data in series by applying phase shifts to said transmission carrier between characteristic instants which are separated by constant equal time intervals of duration $\Delta$ known as Baud intervals, said system further comprising a receiver sensitive to phase shifts in said transmission carrier between said characteristic instants, said transmitter including: a coder for converting data to be transmitted into respective phase shift values corresponding to phase shifts to be applied to said transmission carrier; a symbol synthesizer responsive to said coder for generating the waveform of the phase shift to be obtained between said characteristic instants in accordance with a continuous phase variation law expressible as a function of time in the form of a third degree polynomial of the form $\phi_n(T) - \phi_n(O) = a_n T + b_n T^2 + c_n T^3$, $O \leq T \leq \Delta$, where $\phi_n(T)$ is the phase of said transmission carrier at time T within a Baud interval corresponding to a symbol $S_n$, $\phi_n(O)$ is the phase of said transmission carrier at the beginning of said Baud interval, $\Delta$ is the duration of a single symbol, and $a_n$, $b_n$ and $c_n$ are coefficients determined as a function of a phase shift $\theta_n$ to be performed to synthesize said symbol $S_n$ and phase shifts $\theta_{n-1}$ and $\theta_{n-2}$ performed to synthesize immediately previous symbols $S_{n-1}$ and $S_{n-2}$, respectively; and a modulator responsive to said symbol synthesizer for modulating said transmission carrier in accordance with the output of said symbol synthesizer.

2. A transmission system according to claim 1, in which the coder includes means for causing the data to be transmitted to correspond to a limited number of discrete values of phase shift, wherein the symbol synthesizer is a read only memory storing the different possible shapes of the phase variation law in sampled form, the appropriate shape for the current configuration being selected by the coder from the values of the phase shift to be performed and the values of the two previous phase shifts to have been performed.

3. A transmission system according to claim 2, wherein the samples of the different possible forms of the phase variation law stored in the read only memory constituting the symbol synthesizer comprise an approximation to each form in unit steps which may either be present or absent and of constant amplitude either positive or negative.

4. A transmission system according to claim 3, wherein said read only memory constituting the symbol synthesizer is organized on a page basis, each of which contains the samples for one of the possible shapes of the phase variation law, with the coder including means for addressing the memory by pages and with addressing within a page being performed by a counter which is incremented by the output signal from the modulator and which is reset to zero at each characteristic instant, said modulated transmitter carrier having, between two successive characteristic instants, a fixed number of periods equal to the number of samples in each of the possible forms of the phase variation law.

5. A synchronous data transmission system using a modulated carrier of constant envelope amplitude, the system comprising a transmitter means for transmitting data in series by applying a limited number of phase shifts to a transmission carrier between characteristic intervals which are separated by constant equal time intervals known as Baud intervals, the system further comprising a receiver which is sensitive to phase shifts in the carrier between said characteristic instants and which comprises a synchronous demodulator driven by a local carrier to deliver the instantaneous phase law of the transmission carrier, a predecoder responsive to the output of said demodulator for delivering the instantaneous value of phase shift performed by the transmission carrier over the duration of one Baud interval, a Baud rate recoverer and drift detector for recovering a Baud rate from the output of said predecoder and for detecting drift between transmitter and receiver carrier frequencies, and a decoder which delivers the received data on the basis of the signals from the predecoder and from the Baud rate recoverer and drift detector, the improvement wherein the Baud rate recoverer and drift detector comprises:

- a correlator for performing a double correlation over a duration of several Baud intervals and over the samples of the signal at the output of the predecoder taken at a rate which is equal to an integer multiple n of the Baud rate, said double correlation being performed both as a function of the rank amongst n of each sample and also as a function of the difference between said sample and the nearest of the discrete phase shift values used in transmission; and
- a maximum detector for determining the correlation class having the most members and which delivers the rank out of n of the samples in this class as being the rank corresponding to phase skips between the characteristic instants at the transmitter, and the difference between the samples of said class as being representative of the drift between the transmitter and receiver carrier frequencies.

6. A transmission system according claim 5, wherein said Baud rate recoverer and drift detector comprises a shift register storing the samples of the signal at the output from the predecoder over the duration of the correlation and then delivering them to the decoder circuit.

7. A transmission system according to claim 5, wherein the receiver comprises a local oscillator which delivers a driver frequency from which the local carrier is taken and which is provided with a control loop under the control of the drift signal provided by the maximum detector.

8. A synchronous data transmission system using a modulated carrier of constant envelope amplitude, said system comprising a transmission carrier source, a transmitter means for transmitting data in series by applying phase shifts to said transmission carrier between characteristic instants which are separated by constant equal time intervals of duration $\phi$ known as Baud intervals, said system further comprising a receiver sensitive to phase shifts in said transmission carrier between said characteristic instants, said transmitter including: a coder for converting data to be transmitted into respective phase shift values corresponding to phase shifts to be applied to said transmission carrier; a symbol synthesizer responsive to said coder for generating the waveform of the phase shift to be obtained between said characteristic instants in accordance with a continuous phase variation law expressible as a function of time in the form of a third degree polynomial; and a modulator responsive to said symbol synthesizer for modulating said transmission carrier in accordance with the output of said symbol synthesizer, wherein the symbol synthesizer operates between characteristic instants under the control of said coder and generates a phase variation law $\phi(T)$ which can be expressed as a function of time as follows:

$$\phi(T) - \phi(O) = T\left(a + bT\left(1 - \frac{5T}{9\Delta}\right)\right)$$

where $O \leq T \leq \Delta$ in which $\phi_n(T)$ is the phase of said transmission carrier at time T within a Baud interval corresponding to a symbol $S_n$, $\phi_n(O)$ is the phase of said transmission carrier at the beginning of said Baud interval, a is a coefficient equal to the weighted sum of the last two phase shifts performed using $3/(4\Delta)$ as the coefficient for the previous shift and $3/(16\Delta)$ as the coefficient for the shift before said previous shift, and b is a coefficient equal to $9/(4\Delta^2)$ times the difference between the phase shift to be performed between the characteristic instants in question and the product of the coefficient a for the Baud interval $\Delta$.

* * * * *